United States Patent [19]

Saito et al.

[11] Patent Number: 5,554,672

[45] Date of Patent: Sep. 10, 1996

[54] EPOXY RESIN PRIMER FOR LINING OF WET CONCRETE SURFACES

[75] Inventors: Makoto Saito; Yoshimasa Chiba; Hiroyuki Misaki, all of Saitama-ken, Japan

[73] Assignee: Tonen Corporation, Tokyo, Japan

[21] Appl. No.: 214,917

[22] Filed: Mar. 17, 1994

[30] Foreign Application Priority Data

Mar. 18, 1993 [JP] Japan ................................. 5-082446

[51] Int. Cl.⁶ ........................... C08L 63/00; C08L 63/02; C08G 59/64
[52] U.S. Cl. ........................ 523/466; 525/526; 528/111; 528/124
[58] Field of Search ........................ 523/466; 528/111, 528/124, 526

[56] References Cited

U.S. PATENT DOCUMENTS

| 2,864,775 | 12/1958 | Newey | 528/111 |
|---|---|---|---|
| 2,938,004 | 5/1960 | De Hoff | 528/124 |
| 3,993,707 | 11/1976 | Cummings | 523/111 |
| 5,098,780 | 3/1992 | Nemunaitis et al. | 428/312 |
| 5,229,438 | 7/1993 | Ishida | 523/443 |

FOREIGN PATENT DOCUMENTS

| 0065838 | 5/1982 | European Pat. Off. |
| 0430276A3 | 11/1990 | European Pat. Off. |
| 1507897 | 12/1967 | France . |
| 2180245 | 11/1973 | France . |

OTHER PUBLICATIONS

Clinton, et al. "Ethylene Oxide Polymers And Copolymers", Encycl. Poly Sci & Eng., 6, John Wiley & Sons, pp. 225–6 & 273 (1986).

Lee et al., "Handbook of Epoxy Resins", McGraw Hill Book Co., New York, pp. 7/15–7/27 and 14/4–14/6 (1982 Reissue).

"The Merck Index", 11th ed., S. Budaveri ed., Merck & Co., Rahway NJ, p. 469 (1989).

Chemical Abstracts, vol. 103, No. 24, published Dec. 16, 1985, Columbus, OH.

Primary Examiner—D. R. Wilson
Attorney, Agent, or Firm—Seidel, Gonda, Lavorgna & Monaco, P.C.

[57] ABSTRACT

A primer comprises a liquid epoxy resin, a hydrophobic polyamine compound, a thixotropic agent and a silane coupling agent. After coating the primer on a wet concrete surface of a structure, a reinforced fiber sheet or similar material could be attached to the surface with a high level of adhesive strength without being influenced by the water. The reinforced fiber sheet is impregnated with a matrix resin and cured to achieve a satisfactory reinforcement of the concrete structure.

1 Claim, 3 Drawing Sheets

EPOXY RESIN PRIMER FOR LINING OF WET CONCRETE SURFACES

BACKGROUND OF THE INVENTION

The present invention relates in general to a method of attaching fiber sheet, cloth and non-woven cloth (mat, etc.), containing carbon fiber, glass fiber or similar materials, to a surface of a concrete structure, then having said fiber impregnated with a matrix resin and cured to form a fiber reinforced plastic. It relates particularly to a primer for lining a wet concrete surface, and a lining method and a reinforcing method, which permit attachment of the fiber sheet, cloth, etc., which have a satisfactory adhesion strength, to a wet concrete surface of water containing, concrete structures, such as bridge girders for river bridges, road tunnels, or quay walls in harbors.

Attempts have been made to reinforce concrete structures with a reinforced fiber sheet comprising reinforcing fibers attached unidirectionally to a supporting sheet with an adhesive layer. The reinforced fiber sheet is attached to a surface of concrete structures such as bridge girders for automobile and railway bridges, and the reinforcing fibers are impregnated with a matrix resin and cured to form a fiber reinforced plastic. The applicant of the present invention has previously proposed a reinforced fiber sheet suitable for such purpose and its manufacturing method as well as a method of reinforcing a structure using a reinforced fiber sheet (Japanese Patent Application Laid Open Nos. 3-222734 and 3-224901).

The impregnation of a matrix resin and the attachment of a reinforced fiber sheet described above may be done either by impregnating the reinforcing fibers of the reinforced fiber sheet with the matrix resin beforehand at a reinforcement work site and then attaching the reinforced fiber sheet on a concrete surface of a structure, or by coating a concrete surface with the resin, fixing the reinforced fiber sheet thereon and then pressing the same from above to impregnate the resin into the fibers. Another process which may be used, treats the supporting sheet to allow a resin to penetrate the sheet. A primer is spread over a concrete surface, and the reinforced fiber sheet is attached. Later that resin is applied over the supporting sheet for impregnating the resin into the fibers.

These processes have the following advantages: (1) resin can be impregnated into reinforced fiber materials at a reinforcement work site for reinforcement of concrete structures with good workability; (2) heat curing, which requires manpower at a reinforcement work site, is not necessary, and with the use of the room temperature curing resin, the curing and reinforcement can be easily done by leaving the work as it is; and (3) the reinforcement with a fiber reinforced plastics can be made not only on flat concretes surfaces, but also on curved concrete structures.

To obtain sufficient reinforcement through formation of a reinforced fiber plastic using the reinforced fiber sheet mentioned above, it is important to attain good adhesion of the reinforced fiber sheet on the concrete surface.

However, on water containing, wet concrete surfaces, like a bridge girder of a bridge over a river, a road tunnel, or a quay wall in a harbor, the reinforced fiber sheet cannot be fixed satisfactorily with any of the methods of impregnation of a matrix resin and fixation of a reinforced fiber sheet mentioned above because of the presence of water. Thus, the use of reinforced fiber sheet sometimes does not produce the desired reinforcement.

The above mentioned problems occur not only during reinforcing a concrete structure with the reinforced fiber sheet, but also during waterproofing work of a concrete structure and repair and maintenance of damaged places using the reinforced fiber sheet.

SUMMARY OF THE INVENTION

An object of the present invention is to provide a primer for lining, which allows attachment of a reinforced fiber cloth material, non-woven cloth or sheet of carbon fiber, glass cloth, etc., onto the wet concrete surface of a concrete structure, with a high level of adhesive strength and which gives satisfactory reinforcement of the wet concrete surface by impregnating such fiber materials with a matrix resin and curing the same.

Another object of the present invention is to provide a lining method to attach a reinforced fiber cloth material, non-woven cloth or sheet to the wet concrete surface of a concrete structure, with a high level of adhesive strength A further object of the present invention is to provide a method of reinforcing a concrete structure, even when the surface of the concrete structure is wet, by attaching with a high level of adhesive strength, a unidirectionally reinforced fiber sheet, which is not impregnated with resin, onto a wet concrete surface after applying the primer, and then impregnating the fibers with a matrix resin and curing the resin.

The above stated objects are achieved with the primer for the lining of wet concrete surfaces, the lining method and the reinforcing method according to the present invention. Briefly, the present invention lies in a primer for lining a wet concrete surface comprising a liquid epoxy resin, a hydrophobic polyamine compound, a thixotropic agent and a silane coupling agent.

The present invention also relates to a method of lining a wet concrete surface characterized by applying a primer comprising a liquid epoxy resin, a thixotropic agent and a silane coupling agent to a wet concrete surface, and fixing a cloth material, an unwoven fabric or a sheet material of reinforcing fibers, which is not impregnated with a resin, onto the wet concrete surface by means of impregnation and adhesion using a room-temperature curing resin.

Further, the present invention relates to a method of reinforcing a concrete structure characterized by applying a primer comprising a liquid epoxy resin, a thixotropic agent and a silane coupling agent to a wet concrete surface, and fixing a unidirectionally reinforced fiber sheet, which is not impregnated with a resin, onto the wet concrete surface by means of impregnation and adhesion using a room-temperature curing resin.

Preferably, 0.1 to 50 weight parts of the above mentioned thixotropic agent and 0.1 to 20 weight parts of the silane coupling agent are added per the total 100 weight parts of the liquid epoxy resin and the hydrophobic polyamine compound.

The above mentioned attachment of a cloth material, unwoven fabric, or sheet material of reinforcing fibers, by impregnation with a room-temperature curing resin may be made by impregnating the resin into the reinforcing fibers of a reinforced fiber material such as a cloth material, etc., in advance and then attaching it onto a primer-coated concrete surface, or by applying the resin over a primer-coated concrete surface, and attaching a reinforced fiber material thereon, and then pressing it to the concrete surface from above to impregnate the resin into the fibers, or by tentatively attaching a reinforced fiber material onto a primer-coated concrete surface, and then spreading a resin over it to impregnate the resin into the fibers.

DESCRIPTION OF THE PREFERRED EMBODIMENTS

Now, the present invention will be explained in detail.

As has been explained above, the present invention is largely characterized by applying a primer comprising a liquid epoxy resin, a hydrophobic polyamine compound, a thixotropic additive and a silane coupling agent to a wet concrete surface, so that the reinforced fiber sheets can be satisfactorily attached to wet concrete surfaces of a concrete structure and not influenced by water content.

In the present invention, bisphenol A type epoxy resin, bisphenol F type epoxy resin, phenol novolak type epoxy resin or tetraglycidyldiaminodiphenylmethane (TGDDM) may be used as the liquid epoxy resin for the primer. Liquid epoxy resins with a viscosity at 20° C. of 200,000 cps or less are preferred. If required, reactive or non-reactive diluents may be added to the liquid epoxy resin.

The hydrophobic polyamine compound serves as a curing agent or hardener for the liquid epoxy resin, and the hydrophobic nature of this curing agent renders the primer hydrophobic, and prevents the primer coated on the wet concrete surface from absorbing water.

When the coated primer absorbs water, the properties of the primer film deteriorates after curing, preventing sufficient adhesion of the reinforced fiber sheet attached thereon.

Figure 1A:
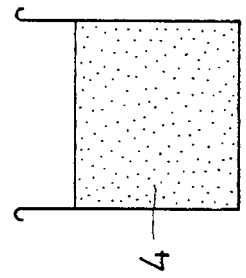
FIG. 1 is a schematic diagram showing various patterns resulting from the mixing test, in which the polyamine compound was mixed with water. This test was used for the definition of hydrophobicity for the polyamine compounds in the present invention.
Figure 1B:
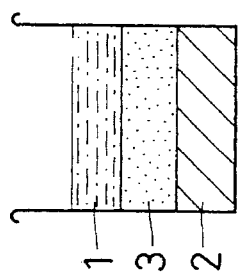
Figure 1C:
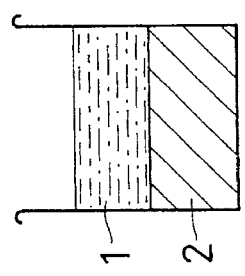

The hydrophobicity of the polyamine compound in the present invention is the hydrophobicity defined by the following mixing test with water:

100 g of water and 100 g of polyamine compound are placed into a transparent 300 milliliter glass cup and stirred at 200 to 300 rpm for 10 minutes with a four blade electric stirrer After standing for one day, the contents divide into phases depending on the polyamine compound: FIG. 1(A) shows the contents are clearly separated into a water layer 1 and a polyamine layer 2, FIG. 1(B) shows the content are clearly separated into a water layer 1, a polyamine layer 2 and an intermediate hydrate layer 3, and FIG. 1(C) shows that the water and the polyamine dissolve without separation to form a compatible layer 4. If the contents divides into a water layer 1 and a polyamine layer 2, the polyamine compound is defined as hydrophobic.

The hydrophobic polyamine compound may be at least one kind of compound selected from the hydrophobic materials consisting of chain aliphatic polyamines, cyclic aliphatic polyamines, or aromatic polyamines and their derivatives.

For example, there may be employed epoxy modified compound made hydrophobic by epoxy modification of such aliphatic polyamines (which are hydrophilic) as diethylenetriamine, triethylenetetramine, tetraethylenepentamine, ethylenediamine and hexamethylenediamine; cyclic aliphatic polyamines such as N-aminoethylpiperazines, menthenediamines or isophoronediamines and their derivatives; and aromatic polyamines such as xylenediamines, methaphenylenediamines or diaminodiphenylmethanes (DDMs) and their derivatives.

Examples of the above mentioned derivatives are addition products ethylene oxide/propylene oxide addition products of acrylonitrile as well as addition products of epoxy resin The thixotropic agent increases the apparent viscosity of the primer (i.e. renders the primer thixotropic) after coating and prevents the primer from being repelled. The primer of the present invention is hydrophobic, so that, if the fluidity of the primer coated onto a wet concrete surface remains high, the primer is gradually repelled after coating and the primer cannot be spread over the entire surface to be treated. Addition of a thixotropic additive may reduce the fluidity of the primer after coating and prevent gradual repellence.

Silica powder (Aerosil type), micapowder, asbestos powder, carbon black, carbon whisker, or calcium carbonate powder may be used as thixotropic agents.

The amount of added thixotropic agent is in the range of 0.1 to 50 parts by weight, preferably 0.5 to 10 parts by weight, per the total of 100 parts by weight of liquid epoxy resin and hydrophobic amine compound. When less than 0.1 weight parts are added, the thixotropic agent is probably not effective and more than 50 weight parts give the primer too high a viscosity and makes coating difficult.

Because the thixotropic agent adds thixotropy to the liquid epoxy resin, it is mixed in advance with the epoxy resin and used as a main component of the primer.

The silane coupling agent is an organic silicon compound with 2 or more kinds of reactive groups within its molecule, and acts in such manner that 1 or 2 reactive groups of the silane coupling agent positioned at a surface of the primer react with the organic materials such as the epoxy resin in the primer and the remaining 1 or 2 reactive groups react with the concrete surface of the wet concrete plane, so that the primer firmly adheres to the wet concrete plane.

For example, chloropropyltrimethoxysilane, vinyltrichlorosilane, vinyltriethoxysilane, vinyltris (2-methoxyethoxy)silane, γ-methacryloxypropyltrimethoxy- silane, β-(3,4-epoxycyclohexyl)ethyltrimethoxysilane, γ-glycydoxypropyltrimethoxysilane, γ-mercaptopropyltrimethoxysilane, γ-aminopropyltrimethoxysilane, γ-aminopropyltriethoxysilane, N-β-(aminoethyl)-γ-aminopropyltrimethoxysilane, and γ-ureidopropyltriethoxysilane, etc., may be used as the silane coupling agent.

The preferred range of added silane coupling agent is 0.1 to 20 parts by weight per the total of 100 parts by weight of liquid epoxy resin and hydrophobic amine compound. Less than 0.1 weight parts cannot provide sufficient adhesive strength of the coated film of the primer after curing with the wet concrete surface, and more than 20 weight parts decreases the film properties of the primer and the adhesive strength gradually.

In the present invention, the main components of the liquid epoxy resin mixed with thixotropic agents, hydrophobic polyamine compounds and silane coupling agents may be used independently for primers of a three-part liquid, and they may also be used for primers of a two-part liquid by mixing the silane coupling agent in advance to the main component or to the hydrophobic polyamine compound. The two-part liquid primer reduces the trouble of mixing at a work site and lowers errors, simplifying preparation of the primer and enhancing the efficiency of operation.

When two-part liquid primers are used, the silane coupling agent with epoxy groups is preferably mixed with the epoxy resin, i.e. the main component, while the silane coupling agent with amino radicals is mixed with the hydrophobic amine compound, i.e. the curing agent. This is because, depending on the combination, the silane coupling agent may react, with the other components of the mixture during storage and change its properties, preventing the primer from its intended adhesive function.

Examples of silane coupling agent with epoxy groups are: β-(3,4-epoxycyclohexyl)ethyltrimethoxysilane, γ-glycydoxypropyltrimethoxysilane. Examples of silane coupling agents with amino radicals are: γ-aminopropyltrimethoxysilane, γ-aminopropyltriethoxysilane, N-β-(aminoethyl)-γ-aminopropyltrimethoxysilane, and N-β-(aminoethyl)-γ-aminopropyltriethoxysilane.

A drying agent (desiccating agent) may be added to secure storage stability of the silane coupling agent. The drying agent is added to the component to which the silane coupling agent is added, either the main component or the curing agent. For example, since a silane coupling agent with epoxy groups is added to the main component, the drying agent is also added to the main component. Drying clay and calcium chlorides, acid anhydrides such as phthalic anhydride or maleic anhydride, orthoformate ester, silica gel and molecular sieves can be used as drying agents. Cure accelerators or cure retardants can be added to control the curing speed of the primer.

Now, examples of the present invention will be explained.

EXAMPLES 1–11

The three-part liquid primer with the compositions shown in Table 1 were prepared as Examples 1 to 11. Below the preparation of the primer in Example 1 will be explained. Primers of the other Examples were prepared in a similar manner.

Five (5) weight parts (5phr) of silica powder (Aerosil made by Nihon Aerosil Co., Ltd.), as the thixotropic additive, were added to 100 parts of Epikote 828, Epikote EP-828 is a diglycidyl ether of bisphenol A, (EP-828) made by Yuka Shell Co., Ltd., as the liquid epoxy resin. After stirring, the mixture was run 3 times through a 3 roll mixer to achieve thorough dispersion and used as the main component of the primer.

Three (3) weight parts of phenol as the cure reaction accelerator were added to 100 weight parts of ethylene oxide modified DDM, as the hydrophobic polyamine compound, and this mixture was used as the curing agent or hardener. The polyamine compound used in this hardener exhibited the hydrophobicity shown in FIG. 1(A) mentioned above in the mixing test with water.

A-187 (γ-glycidoxypropyltrimethoxysilane) made by Nippon Unicar Co., Ltd. was used as the silane coupling agent.

These main component /hardener /silane coupling agents were mixed in a ratio 100 /30 /3 in weight parts and the mixture was used as the primer in Example 1.

Commercially available mortar plates for adhesion test (mortar panel made by Nihon Test Panel Co., Ltd. 70 mm wide ×70 mm long ×20 mm thick) were used for testing and these wet mortar plates were coated with a three-part liquid primer of Examples 1 to 11 for the adhesion tests of the Construction Research Institute type (JIS-A-6909).

Figure 2:
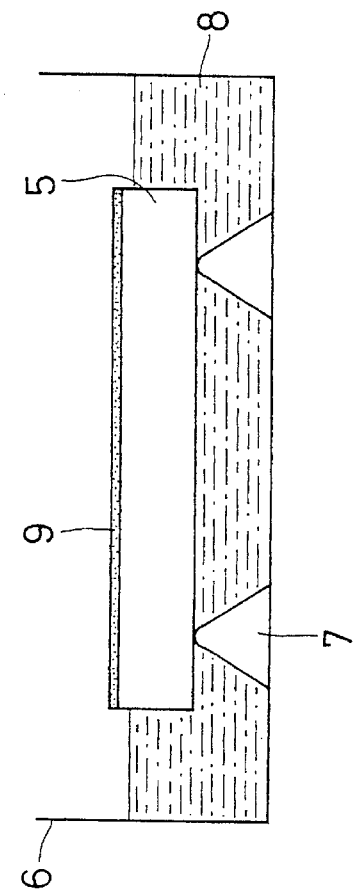
FIG. 2 is a cross sectional view showing a curing method for mortar plates coated with primer in the adhesion test in the present invention.

After sanding of the reinforced plane, each of the mortar plates was immersed in water for one whole day. Then, after removing the plate from the water and wiping the working plane of the mortar plate, primer was coated on the working plane. As shown in FIG. 2, the mortar plate 5 was placed in a container 6 and supported by supporting members 7 with the plane on which the primer 9 was coated (working plane) facing upwards. The container was filled with water 8 to a depth of 5mm below the surface of the mortar plate 5. Thus the mortar plate 5 was set in a wet condition and kept in this state for 2 days at 20° C. for curing the coated film of the primer 9. Later, the mortar plate 5 was removed from the water and left in place for 5 days at 20° C. for curing before using it as a test specimen for the adhesion test.

Figure 3:
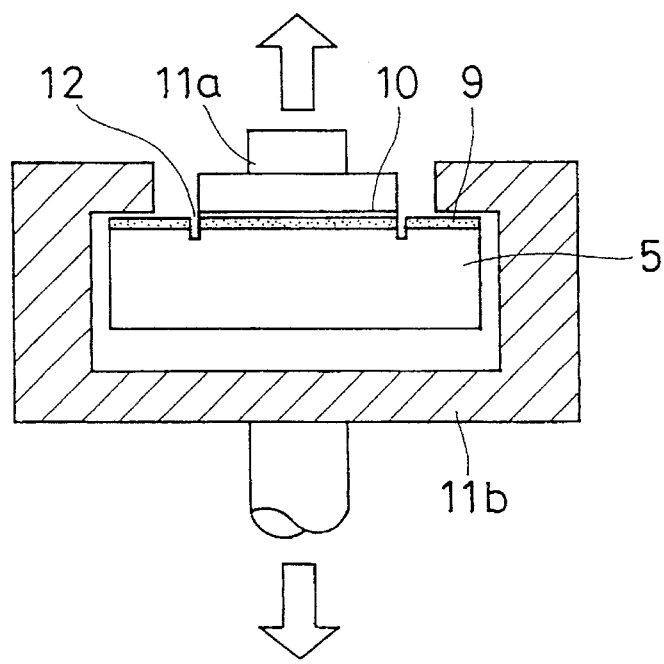
FIG. 3 is a cross-sectional view showing the test arrangement for the adhesion test on mortar plates coated with primer.

Then, as shown in FIG. 3, the primer side 9 of the mortar plate 5, which was the test specimen, was glued to the upper jig 11a of the tensile testing machine (Instron) with adhesive 10, and the plate 5 was pulled apart through the upper and lower jigs 11a, 11b. Notches 12 were made in advance on the mortar plate 5 at the outer ends of the area covered with adhesive 10 from the primer side 9.

The results of the adhesion test of the primers of Examples 1 to 11 are shown in Table 1.

TABLE 1A

| | Main component | | Hardener | | (d) |
|---|---|---|---|---|---|
| Example | (a) Epoxy Resin | (b) Thixotropic Additive | (c) Polyamine compound | Reaction accelerator | Silane coupling agent |
| 1 | EP-828 100 | Aerosil 5 | Ethylene oxide modified DDM 100 | phenol 3 | A-187 |
| 2 | EP-828 100 | Aerosil 5 | Ethylene oxide modified DDM 100 | phenol 3 | A-189 |
| 3 | EP-828 100 | Aerosil 5 | Araldite HY-964 100 | phenol 3 | A-186 |
| 4 | EP-828 100 | Aerosil 5 | Ethylene oxide modified DDM 100 | None | A-187 |
| 5 | EP-828 100 | Asbestos powder 5 | Ethylene oxide modified DDM 100 | phenol 3 | A-187 |
| 6 | EP-152 100 | Aerosil 5 | Ethylene oxide modified DDM 50 Araldite HY-964 50 | phenol 2 | A-187 |
| 7 | EP-828 100 | Aerosil 5 | Ethylene oxide modified DDM 100 | phenol 3 | A-187 |
| 8 | EP-828 100 | Aerosil 50 | Ethylene oxide modified DDM 100 | phenol 3 | A-187 |
| 9 | EP-828 100 | Aerosil 5 | Ethylene oxide modified DDM 100 | phenol 3 | A-187 |
| 10 | EP-828 100 | Aerosil 5 | Ethylene oxide modified DDM 100 | phenol 3 | A-187 |
| 11 | EP-828 100 | Aerosil 5 | Ethylene oxide modified DDM 100 | phenol 3 | A-187 |

TABLE 1B

| Example | Evaluation of Hydrophobicity | Mixing ratio a + b/c/d | b/ a + c | d/ a + c | Adhesion Test Strength kg/cm² | Breakage mode |
|---|---|---|---|---|---|---|
| 1 | Hydrophobic | 100/30/3 | 3.8 | 2.4 | 22 | Base material |
| 2 | Hydrophobic | 100/30/3 | 3.8 | 2.4 | 21 | Base material |
| 3 | Hydrophobic | 100/30/3 | 3.8 | 2.4 | 23 | Base material |
| 4 | Hydrophobic | 100/30/3 | 4.1 | 2.6 | 23 | Base material |
| 5 | Hydrophobic | 100/30/3 | 3.8 | 2.4 | 20 | Base material |
| 6 | Hydrophobic | 100/30/3 | 4.0 | 2.5 | 23 | Base material |
| 7 | Hydrophobic | 100/30/3 | 3.8 | 2.4 | 22 | Base material |
| 8 | Hydrophobic | 100/20/2 | 38.7 | 2.3 | 23 | Base material |
| 9 | Hydrophobic | 100/30/15 | 3.8 | 12.1 | 21 | Base material |
| 10 | Hydrophobic | 100/30/3 | 0.8 | 2.3 | 22 | Base material |
| 11 | Hydrophobic | 100/30/1 | 3.8 | 0.8 | 20 | Base material |

Note: Values in ingredients and in mixing ratio: parts by weight.
Hydrophobicity: Results of the mixing test with water as shown in FIG. 1 (A).
A-186: β -(3,4-epoxycyclohexyl)ethyltrimethoxysilane;
A-187: γ -glycydoxypropyltrimethoxysilane;
A-189: δ -mercaptopropyltrimethoxysilane:
Araldite HY-964: Cyclic aliphatic polyamine.

Also, commercially available mortar plates for adhesion tests (mortar panels made by Nihon Test Panel Co., Ltd., 70 mm×150 mm×10 mm) were used and bending tests were performed with unidirectional carbon fiber sheets attached with the three-part liquid primers of Examples 1 to 11. The same procedures as for the above mentioned tests were employed regarding setting the mortar plates under wet conditions and coating and curing of the three-part liquid primer.

After that, each of the plates was removed from the water and 1 layer of unidirectional carbon fiber sheet (Forca Tow Sheet FTS-C1-17 made by Tonen Corporation) was attached to the working plane coated with the primer so that the fibers were oriented in the lengthwise direction of the mortar plate, and impregnated with the matrix resin. Epoxy resin adhesive was used as the matrix resin for the installation work (FR Resin FR-E3 made by Tonen Corporation) and applied over the primer-coated surface. Then carbon fiber sheet cut uniformly to match the area of the mortar plate ( 70 mm wide ×150 mm long) was attached. After further replenishing the above mentioned resin adhesive, impregnation was made using a rubber spatula.

The mortar plate with attached carbon fiber sheet was left in place for 7 days at 20° C. for curing and used as a bending test specimen.

Figure 4:
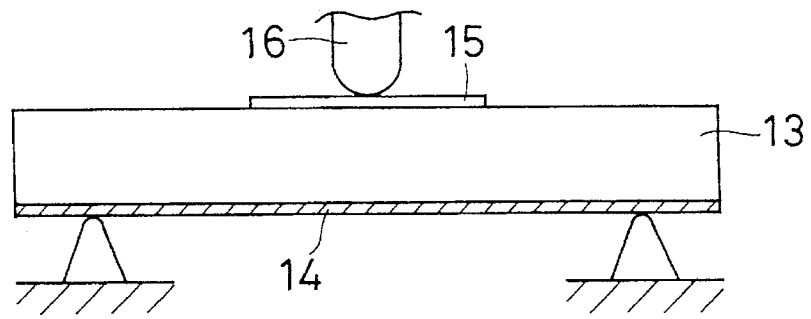
FIG. 4 is a cross sectional view showing the test arrangement for the bending test of mortar plates on which a carbon fiber sheet has been applied.

As shown in FIG. 4, the test mortar plate 13 was supported at two points 100 mm apart with the carbon fiber sheet side 14 facing downwards. A plunger 16 (radius of curvature at its fore end: 5mm) of a measuring instrument (Autograph made by Shimadzu Corporation) was pressed against the center of the mortar plate 13 through a 3 mm thick Teflon cover plate 15 positioned on the mortar plate. A 3-point bending test was performed delivering pressure to the plunger at a cross head speed of 2 mm/minute, to evaluate the reinforcement effect of these carbon fiber sheets. Table 3 shows the results of the tests.

Controls 1 to 5

The three-part liquid primers for Controls 1 to 5 were prepared with the compositions shown in Table 2 according to the same preparation method as for the primer of Example 1.

The primers were coated onto mortar plates (70 mm wide×70 mm long×20 mm thick) in a prescribed wet condition in the same way as in Examples 1 to 11. After the prescribed curing, the plates were used as adhesion test specimens for the Construction Research Institute type adhesion test (JIS-A-6909). Table 2 shows the results of the tests.

TABLE 2A

| | Main component | | Hardener | | (d) |
|---|---|---|---|---|---|
| Control | (a) Epoxy resin | (b) Thixotropic agent | (c) Polyamine compound | Reaction accelerator | Silane coupling agent |
| 1 | EP-828 100 | Aerosil 5 | Ethylene oxide modified DDM 100 | phenol 3 | A-187 |
| 2 | EP-828 100 | Aerosil 5 | Ethylene oxide modified DDM 100 | phenol 3 | A-187 |
| 3 | EP-828 100 | None | Ethylene oxide modified DDM 100 | phenol 3 | A-187 |
| 4 | EP-828 100 | Aerosil 5 | Ethylene oxide modified DDM 100 | phenol 3 | None |
| 5 | EP-828 100 | Aerosil 5 | Ethylene oxide modified triethylene-tetramine 100 | phenol 1 | A-187 |

TABLE 2B

| Control | Evaluation of Hydrophobicity | Mixing ratio a + b/c/d | b/ a + c | d/ a + c | Strength kg/cm² | Adhesion Test Breakage Mode |
|---|---|---|---|---|---|---|
| 1 | Hydrophobic | 100/30/30 | 3.8 | 24.1 | 22 | Breakage at interface |
| 2 | Hydrophobic | 100/15/2 | 77.4 | 3.1 | Coating impossible because of high viscosity. | |
| 3 | Hydrophobic | 100/30/3 | 0 | 2.3 | Some portions were not coated because of repelling of resin. | |
| 4 | Hydrophobic | 100/30/0 | 3.8 | 0 | 1 | Breakage at interface |
| 5 | No hydrophobicity | 100/15/3 | 4.3 | 2.7 | 6 | Breakage at interface |

Note: Values in ingredient, and in mixing ratio: parts by weight.
No hydrophobicity: The results of the mixing test with water was FIG. 1 (B) or (c).

Similarly, unidirectional carbon fiber sheets were attached to mortar plates (70 mm×150 mm×10 mm) in a prescribed wet condition and the plates were used as test specimens after the prescribed curing.

The three-point bending test was carried out under similar conditions. Table 3 shows the results of the test.

TABLE 3A

| Example | Breaking load in bending test kg/cm² | Breakage mode | Remarks |
|---|---|---|---|
| 1 | 405 | Oblique shear fracture | — |
| 2 | 410 | Oblique shear fracture | — |
| 3 | 395 | Oblique shear fracture | — |
| 4 | 380 | Oblique shear fracture | — |
| 5 | 420 | Oblique shear fracture | — |
| 6 | 400 | Oblique shear fracture | — |
| 7 | 386 | Oblique shear fracture | — |
| 8 | 393 | Oblique shear fracture | — |
| 9 | 407 | Oblique shear fracture | — |
| 10 | 411 | Oblique shear fracture | — |
| 11 | 403 | Oblique shear fracture | — |

TABLE 3B

| Control | Breaking load in bending test kg/cm² | Breakage mode | Remarks |
|---|---|---|---|
| 1 | 120 | Peeling break at interface | — |
| 2 | — | — | Coating of primer impossible because of high viscosity |
| 3 | — | — | Some portions were not coated because of repellence of resin |
| 4 | 90 | Peeling break at interface | — |
| 5 | 70 | Peeling break at interface | — |

As shown Table 1, a higher primer adhesion strength of 20 to 23 kg/cm² was obtained in Examples 1 to 11. The breakage mode was not a breakage at the interface of the primer coated film, but a breakage in base material of the in mortar plates. In contrast, as shown in Table 2, in Controls 2 and 3, the adhesive strength and breakage mode could not be measured because the primer was impossible to coat due to its high viscosity or was repelled to produce uncoated portions. Also, even in Controls 1, 4 and 5, where the primer could be properly coated, the adhesive strength was as low as 1 to 8 kg/cm², and the breakages occurred at the interface of the primer coated film.

Figure 5A:
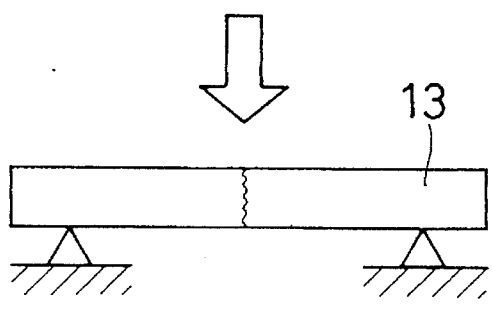
FIGS. 5(A), 5(B) and 5(C) are cross sectional views showing various forms of breakage of mortar plates in the bending test.
Figure 5B:
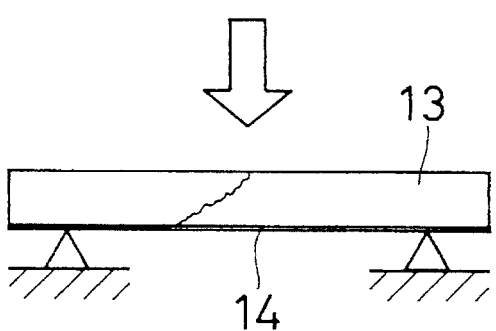

Non-reinforced mortar plates had breaking loads of 40 kgf. In Examples 1 to 11, as shown in Table 3, high breaking loads could be obtained because the mortar plates had been reinforced with carbon fiber. For example, Example 1 showed a breaking load of 405 kgf. With regard to the breakage mode, the non-reinforced mortar plate 13 cracked in a straight line at its center and broke as shown in FIG. 5 (A), while the mortar plate 13 of Example 1 cracked obliquely from the center and broke as shown in FIG. 5(B). Also, there was no peeling of the carbon fiber sheet 14 at the adhesive interface (no peeling of the sheet 14).

Figure 5C:
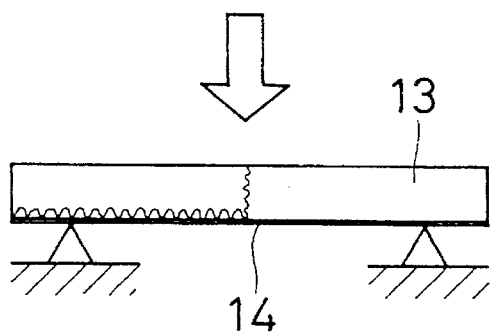

Conversely, Control 1, for example, showed a breaking load of 120 kgf, indicative of a higher breaking load than that of non-reinforced plates, but was far below the value of Example 1. Also, FIG. 5(C) shows that with regard to the breakage mode, breakage occurred after a crack had formed in the tensile plane (plane having a carbon fiber sheet 14 attached) of the mortar plate 13 followed by peeling at the interface with the attached sheet 14.

EXAMPLES 12 to 16

Five (5) weight parts of silica powder (Aerosil made by Nihon Aerosil Co., Ltd.) were mixed with 100 weight parts of liquid epoxy resin (Epikote 828 made by Yuka-Shell Co., Ltd.). After the mixture was run 3 times through a 3-roll mixer to thoroughly disperse the silica powder, 5 weight parts of γ-glycidoxypropyltrimethoxysilane (A-187 made by Nippon Unicar Co., Ltd.) were added and mixed by stirring. The mixture thus obtained was used as the main component liquid A of the primer.

Three (3) weight parts of phenol, as a cure reaction accelerator, were added to 100 weight parts of ethylene oxide modified DDM, the hydrophobic polyamine compound. The mixture thus obtained was used as the hardener liquid B.

To investigate any changes in the adhesive properties of this main component liquid A after storage, the liquid A was placed in an ordinary, commercially available 1 liter metal can and closed with a plug. It was then kept in a room with a temperature of 20° C. and a relative humidity of 40%. The Liquid A was taken out periodically during a period of 2 months and mixed with the hardener liquid B, to form the primer of Examples 12 to 16. The mixing ratio of the main component liquid A and the hardener liquid B was 100/30 in parts by weight.

Similar to the procedure used in Examples 1 to 11, the primer thus prepared was spread onto mortar plates kept in a wet condition. The plates were used as adhesion test specimens after the prescribed curing, and the same adhesion test of the Construction Research Institute type (JIS-A-6909) was performed. Table 4 shows the results.

EXAMPLES 17 to 20

Five (5) weight parts of silica power (Aerosil made by Nihon Aerosil Co., Ltd.) were mixed with 100 weight parts of liquid epoxy resin (Epikote 828 made by Yuka-Shell Co., Ltd)(EP-828). The mixture was then run 3 times through a 3-roll mixer and was used as the main component liquid A of the primer.

Three (3) weight parts of phenol as a cure reaction accelerator were added to 100 weight parts of the ethylene oxide modified DDM as the hydrophobic polyamine compound. Further, 15 weight parts of γ-aminopropyltriethoxysilane (A1100 made by Nippon Unicar Co., Ltd.) were added and mixed by stirring, and the mixture thus obtained was used as the hardener liquid B.

To investigate any change in the adhesive properties of this hardener liquid B after storage, the liquid B was placed in an ordinary, commercially available 1 liter metal can and closed with a plug. It was then kept in a room at a temperature of 20° C. and a relative humidity of 40%. The liquid B was taken out periodically during a period of 1 month and was mixed with the main component liquid A, to form the primer of Examples 17 to 20. The mixing ratio of the main component liquid A and the hardener liquid B was 100/30 in weight parts.

Similar to the procedure used in Examples 1 to 11, the primers thus prepared were spread onto mortar plates kept in a prescribed wet condition and used as adhesion test specimens after the prescribed curing. The same adhesion test of the Construction Research Institute type (JIS-A-6909) was performed. Table 4 shows the results thereof.

TABLE 4A

| | Main component Liquid A | | | Hardener Liquid B | | |
|---|---|---|---|---|---|---|
| Example | (a) Epoxy resin | (b) Thixotropic additive | (d) Silane coupling agent | (c) Polyamine compound | Reaction accelerator | (d) Silane coupling agent |
| 12 | EP-828 100 | Aerosil 5 | A-187 5 | Modified DDM 100 | phenol 3 | None |
| 13 | EP-828 100 | Aerosil 5 | A-187 5 | Modified DDM 100 | phenol 3 | None |
| 14 | EP-828 100 | Aerosil 5 | A-187 5 | Modified DDM 100 | phenol 3 | None |
| 15 | EP-828 100 | Aerosil 5 | A-187 5 | Modified DDM 100 | phenol 3 | None |
| 16 | EP-828 100 | Aeroil 5 | A-187 5 | Modified DDM 100 | phenol 3 | None |
| 17 | EP-828 100 | Asbestos powder 5 | None | Modified DDM 100 | phenol 3 | A-1100 15 |
| 18 | EP-152 100 | Aerosil 5 | None | Modified DDM 100 | phenol 3 | A-1100 15 |
| 19 | EP-828 100 | Aerosil 5 | None | Modified DDM 100 | phenol 3 | A-1100 15 |
| 20 | EP-828 100 | Aerosil 50 | None | Modified DDM 100 | phenol 3 | A-1100 15 |

TABLE 4B

| | Mixing Ratio | | | No. of days in | Adhesion Test | |
|---|---|---|---|---|---|---|
| Example | A/B | b/ a + c | d/ a + c | storage of Liquid A or Liquid B, days | Strength kg/cm$^2$ | Breakage mode |
| 12 | 100/30 | 3.8 | 3.8 | 0 | 20 | Base material |
| 13 | 100/30 | 3.8 | 3.8 | 14 | 23 | Base material |
| 14 | 100/30 | 3.8 | 3.8 | 28 | 19 | Base material |
| 15 | 100/30 | 3.8 | 3.8 | 42 | 21 | Base material |
| 16 | 100/30 | 3.8 | 3.8 | 60 | 25 | Base material |
| 17 | 100/30 | 4.0 | 3.2 | 0 | 16 | Base material |
| 18 | 100/30 | 4.0 | 3.2 | 14 | 18 | Base material |

TABLE 4B-continued

| | Mixing Ratio | | | No. of days in | Adhesion Test | |
|---|---|---|---|---|---|---|
| Example | A/B | b/ a + c | d/ a + c | storage of Liquid A or Liquid B, days | Strength kg/cm$^2$ | Breakage mode |
| 19 | 100/30 | 4.0 | 3.2 | 25 | 16 | Base material |
| 20 | 100/30 | 4.0 | 3.2 | 30 | 15 | Base material |

Note: Values given for components and mixing ratio: parts by weight.
Modified DDM: Ethylene oxide modified DDM.
A1100: γ-aminopropyltrimethoxysilane.

As shown in table 4, in Examples 12 to 16 the silane coupling agent was mixed with the main component liquid A, but the adhesive properties of the primer did not deteriorate even after storing liquid A for a period of 2 months. Similarly, with Examples 17 to 20 the silane coupling agent was mixed with the hardener liquid B, but the adhesive properties of the primer did not deteriorate even after storing liquid B for a period of 1 month.

As explained above, according to the present invention the primer comprising a liquid epoxy resin, a hydrophobic polyamine compound, a thixotropic agent and a silane coupling agent is coated onto wet concrete surfaces of concrete structures, so that fiber sheets, cloths and nonwoven cloths (mat, etc.) containing carbon fiber, glass fiber, etc. can be attached to the wet concrete surfaces with a high level of adhesive strength, providing a lining without being influenced by water. Therefore, concrete structures can be satisfactorily reinforced, and if desired, can be waterproofed and repaired, by impregnating the fibers with a matrix resin (room-temperature curing resin) and curing thus impregnated fibers.

What is claimed is:

1. A primer for a lining of a wet concrete surface comprising at least one liquid epoxy resin selected from the group consisting of a diglycidyl ether of bisphenol A, a diglycidyl ether of bisphenol F and tetraglycidyldiaminodiphenylmethane, a hydrophobic ethylene oxide-modified diaminodiphenylmethane, a thixotropic agent and a silane coupling agent, wherein the amount of hydrophobic ethylene oxide-modified diaminodiphenylmethane is an amount effective for curing the liquid epoxy resin, the amount of the thixotropic agent is 0.1–50 weight parts per total 100 weight parts of the liquid epoxy resin and the hydrophobic ethylene oxide-modified diaminodiphenylmethane, the amount of the silane coupling agent is 0.1–20 weight parts per total 100 weight parts of the liquid epoxy resin and the hydrophobic ethylene oxide-modified diaminodiphenylmethane, and the hydrophobicity of the ethylene oxide-modified diaminodiphenylmethane is defined by a test in which
(1) 100 g of the ethylene oxide-modified diaminodiphenylmethane and 100 g of water are poured into a glass cup.
(2) the content of said cup consisting of the ethylene oxide-modified diaminodiphenylmethane and the water are stirred at room temperature to the extent that a mixture is formed, and
(3) the mixture is allowed to stand for one day at room temperature whereby the ethylene oxide-modified diaminodiphenylmethane is considered hydrophobic if the standing mixture is clearly separated into an ethylene oxide-modified diaminodiphenylmethane layer and a water layer, as observed by the eye.

* * * * *